Oct. 4, 1938.   O. MYERS   2,132,214

MEASURING SYSTEM

Filed Jan. 27, 1937

INVENTOR
O. MYERS
BY
M. P. McKenney
ATTORNEY

Patented Oct. 4, 1938

2,132,214

UNITED STATES PATENT OFFICE 2,132,214

MEASURING SYSTEM

Oscar Myers, Brooklyn, N. Y., assignor to Bell Telephone Laboratories, Incorporated, New York, N. Y., a corporation of New York Application January 27, 1937, Serial No. 122,579

10 Claims. (Cl. 175—183)

This invention relates to measuring systems and particularly to bridge systems for measuring electrical characteristics.

Its object is to provide simplified automatically responsive bridge systems for indicating unknown electrical characteristics.

Bridges of the Wheatstone type well known in the art have heretofore been used for measuring an unknown resistance or other electrical characteristics of an element inserted in one leg of the bridge by adjusting the bridge to a balanced condition and then calculating the resulting value or reading a metering instrument inserted in the bridge circuit.

It is a feature of the present invention to provide a self-adjusting bridge circuit in which when an element having unknown electrical characteristics is attached to one leg of the bridge for measurement, said element causes the electrical characteristics of the other three legs in the bridge to be automatically changed until a balanced condition exists.

Another feature is an arrangement whereby when said balanced condition has been reached the unknown characteristics of said element are visually indicated.

Figure 1:
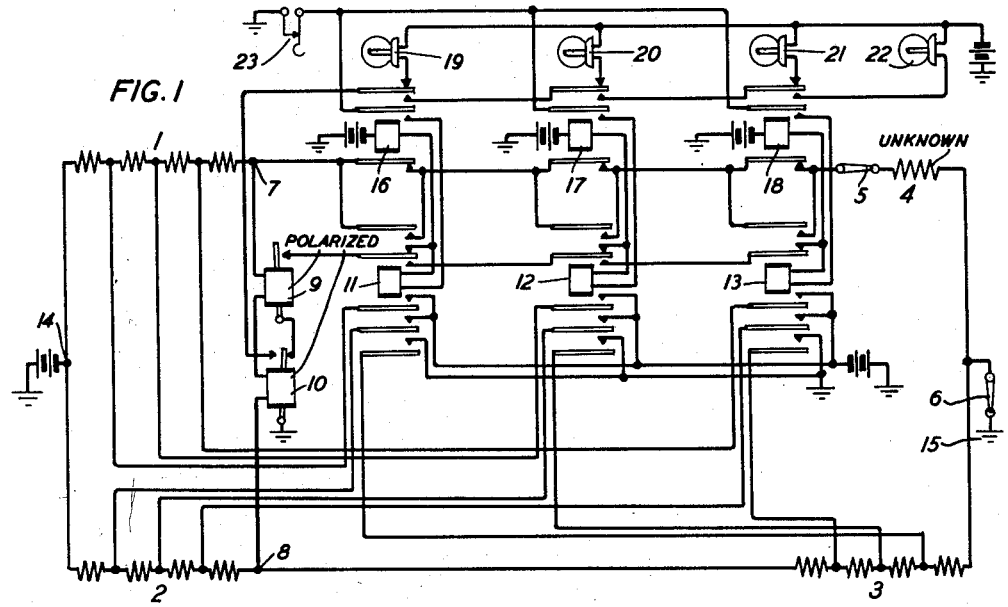
Figure 2:
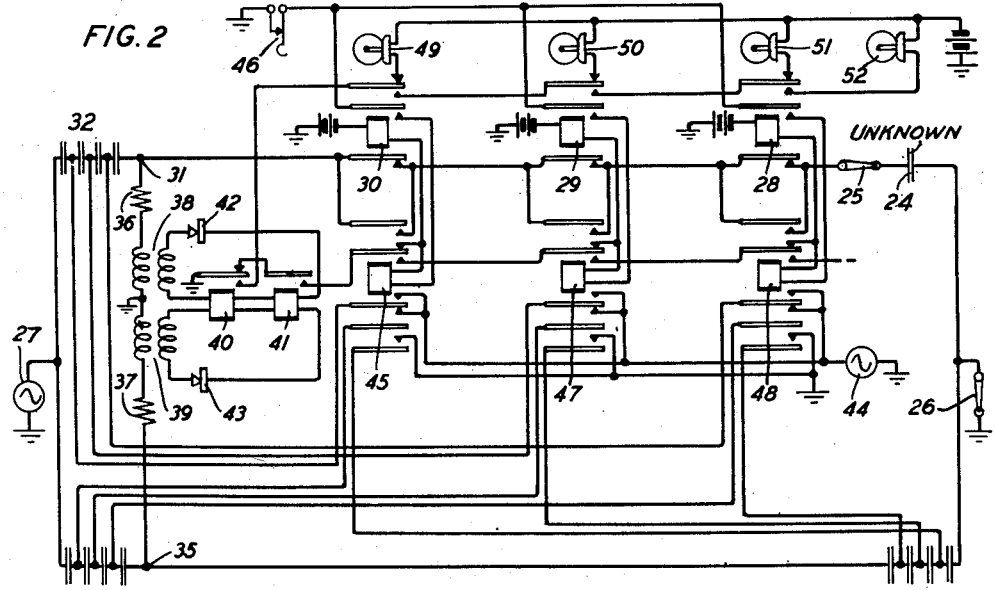

The invention has been illustrated in the accompanying drawing in which:

Fig. 1 shows an embodiment of the invention in its preferred form applied to a resistance bridge; and Fig. 2 shows a modified form of the invention applied to a capacity bridge.

Referring now to Fig. 1, the bridge consists of three legs 1, 2 and 3 each comprising a series of resistances and a fourth leg consisting of the unknown resistance 4. This resistance 4 may represent any circuit the resistance of which is to be measured such as a telephone line. This circuit may be attached as the fourth leg in the bridge in any suitable manner, for example, by the switches 5 and 6. Between points 7 and 8 is connected in series relays 9 and 10 which are polarized to respond to current in opposite directions. Circuit connections extend from between the individual resistance in the groups constituting legs 1, 2 and 3 and terminate in battery and ground connections through armatures of relays 11, 12 and 13, while the first resistances in the groups constituting legs 1 and 2 are connected to battery and ground at point 14 and the last resistance in the group constituting leg 3 is grounded at point 15. Relays 16, 17 and 18 are associated respectively with the circuits of relays 11, 12 and 13 and the armatures of these relays are connected to the signal lamps 19, 20, 21 and 22 which when lighted indicate or symbolize certain resistance characteristics of the unknown resistance 4.

The operation of this bridge circuit will now be described. If the keys 5 and 6 are closed the automatic measuring of the unknown resistance is begun. If the unknown resistance 4 is less than the resistance of the leg 3 current will flow through the bridge from ground through switch 6, resistance 4, switch 5, lower armatures and back contacts of relays 18, 17 and 16 in series, point 7, through windings of relays 9 and 10, point 8, resistances of leg 2 to battery. Relay 9 is so polarized that it will operate in this circuit while relay 10 which is polarized in the opposite direction will not operate. This closes a circuit from battery through the winding of relay 16, upper inner armature and back contact of relay 11, contacts of relays 9 and 10 in series to ground. This circuit causes the operation of relay 16 which in operating opens the bridge and releases relay 9 and permits relay 11 to operate in series with relay 16 from battery through the windings of relays 16 and 11, the upper inner armature and front contact of relay 16, switch 23 to ground. This circuit locking the relays 16 and 11 in operated position. Relay 11 eliminates the first resistances in legs 1 and 2 from the bridge circuit by closing connections from battery through its inner and middle lower armatures and front contacts to the points between the first and second resistances in these legs, and eliminates the first resistance in leg 3 from the bridge circuit by closing a connection from ground through the lower outer armature and front contact to the point between the first and second resistance of leg 3 thus reducing the resistances of these three legs an equal amount. If the resistance of the unknown resistance 4 is still less than the remaining resistances of leg 3, current will again flow through relay 9 to cause it to operate. This time from ground, switch 6, resistance 4, switch 5, lower contacts of relays 18 and 17, upper outer armature and front contact of relay 11, point 7, windings of relays 9 and 10, point 8, the remaining resistances of leg 2, middle lower armature and front contact of relay 11 to battery. Relay 9 in operating a second time completes a circuit for the operation of relay 17 from battery through the winding of this relay, upper inner armature and back contact of relay 12, inner upper armature and front contact of relay 11, contacts of relays 9 and 10 in series to ground. Relay 17 in operating causes the operation of relay 12 over an obvious circuit and relays 17 and 12 are locked to ground applied at the upper inner armature and front contact of relay 17 through switch 23. The operation of relay 12 eliminates the second resistances in legs 1, 2 and 3 by the closing of connections through contacts and the lower armatures of this relay to battery and ground. If the unknown resistance 4 is still lower than the remaining two resistances in leg 3, relay 9 will again be operated and in this case cause the operation of relay 18 in the same manner as relay 17 was operated and this relay in turn causes the operation of relay 16 in the same manner as relays 11 and 12 were operated, relays 16 and 18 locking to ground at the upper inner armature and front contact of relay 18. The operation of relay 13 removes the third resistances in legs 1, 2 and 3 from the bridge circuit over the lower armatures and front contacts of relay 13.

If now the unknown resistance 4 is higher than the remaining resistance in leg 3, current will flow from ground, the lower armature and front contact of relay 13, the last resistance in leg 3, point 8, relays 10 and 9, point 7, the last resistance of leg 1, lower inner armature and front contact of relay 13 to battery. In this case the current will therefore pass in the opposite direction between points 8 and 7 and therefore cause the operation of relay 10 while relay 9 will remain unoperated. Relay 10 opens the circuit to ground, passing through contacts of relay 9 and closes a circuit between ground through the left-hand contact of relay 10, upper outer armatures and front contacts of relays 16, 17 and 18, lamp 22 and battery. This lights lamp 22 which indicates that the resistance of the unknown resistance 4 is approximately of a certain value, that is, approximately the value of the last resistance in leg 3 which is known. In case the resistance of the unknown resistance 4 had a value greater than the last two resistances in leg 3, relays 18 and 13 would not have operated, and on the operation of relay 10 a circuit would instead have been completed for the lighting of lamp 21 over a circuit from battery, lamp 21, upper outer armature and back contact of relay 18, upper outer armatures and front contacts of relays 17 and 16 to ground at the contacts of relay 10. The lighting of lamp 21 would have indicated that the resistance of unknown resistance 4 was approximately that of the last two resistances of leg 3. In a similar manner lamp 20 or 19 would have operated if the resistance of the unknown resistance 4 had been greater than the last two or three resistances of leg 3 and lamp 20 or 19 would have indicated these conditions. Thus, it will be seen that lamps 19 to 22 will indicate the resistance values of the unknown resistance 4 automatically as soon as the switches 5 and 6 are closed. Other unknown resistances may be measured in a similar manner by inserting them in the circuits in place of the unknown resistance 4. At the beginning of each test the relays that were locked in the preceding test may be unlocked by the opening of the locking circuits for these relays at switch 23.

In Fig. 2 the principles of this invention have been applied in the same manner as in Fig. 1 to a capacity bridge circuit in which the unknown capacity of a conductor or circuit may be measured. The circuit containing this unknown capacity is indicated at 24 and may be connected through keys 25 and 26 to the circuit as shown to the alternating current source 27 through contacts of relays 28, 29 and 30, point 31 and condensers of leg 32 corresponding to leg 1 in Fig. 1. Legs 33 and 34 comprising condensers corresponding to legs 2 and 3 of Fig. 1. Attached between the various condensers of legs 32, 33 and 34 are taps connected in the same manner as the taps from the resistances of legs 1, 2 and 3. The points 31 and 35 are connected through resistances 36 and 37, and the left-hand windings of repeating coils 38 and 39 to ground. The right-hand windings of the repeating coils 38 and 39 are connected through windings of relays 40 and 41 in independent circuits. The circuit for the right-hand winding of repeating coil 38 contains in addition a rectifier 42 and the circuit for the right-hand winding of repeating coil 39 contains a rectifier 43. The windings of these two circuits through relays 40 and 41 are so arranged that when the direct current through the upper windings is greater than the direct current through the lower windings, relay 41 operates and when the direct current through the lower windings is greater than the direct current through the upper windings relay 40 operates. The circuit arrangements in this figure are otherwise similar to those of Fig. 1.

The operation of this bridge circuit is similar to the operation of the resistance bridge shown in Fig. 1. The alternating current sources 28 and 44 are substituted for the direct current sources in Fig. 1, and the circuits for relays 40 and 41 corresponding to relays 9 and 10 of Fig. 1 are changed to permit the bridge circuit to function with the condensers in the legs 32, 33 and 34 and the unknown capacity 24 of the line. When switches 26 and 27 are closed alternating current will be produced in the various branches of the bridge circuit as follows: One circuit will extend between the alternating current source 27, condensers of leg 32, lower armatures and contacts of relays 30, 29 and 28, switch 25, the unknown condensers 24, switch 26 and ground with a branch circuit between point 31, resistance 36, left-hand winding of repeating coil 38 and ground. Another circuit will extend between the alternating current source 27, condensers of leg 33, condensers of leg 34, switch 26 and ground, with a branch circuit between point 35, resistance 37, left-hand winding of repeating coil 39 and ground. If the capacity of the unknown condensers 24 is less than the capacity of the condensers of leg 34 it is evident that the alternating current passing through the repeating coil 38 will be greater than that passing through the repeating coil 39. It therefore follows that the direct current effected through the rectifier 42 and the upper windings of relays 40 and 41 will cause relay 41 to operate. The operation of relay 41 closes a circuit for the operation of relay 30 which in turn causes the operation of relay 45. These two relays are locked to ground through switch 46. The operations are continued in this manner to operate relays 29 and 47 and relays 28 and 48, if necessary, until the combined capacity of the remaining condensers in leg 34 is less than the capacity of the unknown condensers 24 when relay 40 operates instead of relay 41 to light the corresponding lamp 49, 50, 51 or 52 to indicate the particular value of the capacity of the unknown condensers 24. The relays may be reset for testing of the capacity of other conductors by the opening of switch 46 to release the locked relay.

What is claimed is:

1. A bridge circuit having three sides of variable resistance and one side of fixed and unknown resistance, and counting relays for removing increments of resistance from the variable sides to approach a balance with the fixed side.

2. In a bridge circuit for measuring resistance having three sides of variable resistances and an external resistance connectable as a fourth side of said bridge, two polarized relays serially connected between two bridge sides, and means operative on the connection of said external resistance to said bridge for operating one of said relays repeatedly to adjust the resistance of the other three sides of said bridge in equal steps to match said external resistance and for then operating said other relay to indicate the matched condition.

3. A bridge circuit having three sides of variable resistance and one side of a fixed and unknown resistance, two polarized relays serially connected between two sides of said bridge, a series of counting relays, one of said polarized relays operating when an unbalanced condition exists in said bridge due to the unknown resistance and the other of said polarized relays operating when a balanced condition exists, a series of counting relays, and means for operating said counting relays in steps in response to the repeated operation of said first polarized relay, and means responsive to the operation of said counting relays for removing increments of resistance from the three sides of variable resistance in the bridge to establish a condition of balance and means operating when a balanced condition has been established in response to the operation of said other relay and the operation of the counting relays for visually indicating this condition.

4. A bridge circuit having three elements of variable capacities and one side of a fixed and unknown capacity, means for varying automatically the first mentioned three elements until a condition of balance is reached and means operated when said balanced condition has been established for visually indicating it.

5. In a bridge circuit for measuring capacities having three sides of variable condensers and an element of unknown capacity connectable as a fourth side of said bridge, two relays, circuit means for inductively connecting said relays between two bridge sides, and means operative on the connection of said unknown capacity to said bridge for operating one of said relays repeatedly to adjust the capacity of the other three sides of said bridge in equal steps to match said unknown capacity and for then operating said other relay to indicate this matched condition.

6. In a bridge circuit for measuring capacities having three sides of variable condensers and an element of unknown capacity connectable in the fourth side of said bridge, two induction coils, one coil having one of its windings connected between one of said three sides and the fourth side of said bridge to ground and the other coil having one of its windings connected between the other two sides of said bridge, two rectifiers, two relays having two windings each, two circuits for said relays each circuit including a rectifier, one winding of a different repeating coil and one winding each of said relays, said circuits being so connected to the windings of said relay that when current in one circuit is greater than current in the other circuit one relay will operate, and when current in the other circuit is greater said other relay will operate, means operating in response to the operation of one of said relays to adjust the condensers in said three legs in equal steps to match the unknown capacity in the fourth side, and means operating in response to the operation of said other relay for indicating said matched condition.

7. A bridge having three elements of variable capacity and one side of fixed and unknown capacity, and means for simultaneously and automatically varying the first three elements until a condition of balance is reached.

8. A bridge having three elements of variable electrical characteristics and one side of fixed and unknown characteristics, and means for automatically varying in equal successive steps the first-mentioned three elements until a condition of balance is reached.

9. A bridge circuit having three elements of variable resistance and one side of a fixed and unknown resistance, and means for automatically varying in equal successive steps the first three elements until a condition of balance is reached.

10. A bridge circuit having three elements of variable capacities and one side of a fixed and unknown capacity, and means for automatically varying in equal successive steps the first-mentioned elements until a condition of balance is reached.

OSCAR MYERS.